Aug. 24, 1965 YOSHIYO WADA 3,202,771
SLIP CONTACTING DEVICE FOR ROTARY MAGNETIC HEADS IN
A MAGNETIC RECORDING AND REPRODUCING EQUIPMENT
Filed Jan. 3, 1962 3 Sheets-Sheet 1

United States Patent Office 3,202,771

Patented Aug. 24, 1965

3,202,771

SLIP CONTACTING DEVICE FOR ROTARY MAGNETIC HEADS IN A MAGNETIC RECORDING AND REPRODUCING EQUIPMENT

Yoshiyo Wada, Kanagawa-ku, Yokohama, Japan, assignor to Victor Company of Japan, Limited, Yokohama, Japan, a corporation of Japan Filed Jan. 3, 1962, Ser. No. 164,018

Claims priority, application Japan, Feb. 6, 1961, 36/4,338

2 Claims. (Cl. 179—100.2)

This invention relates to a slip contacting device for rotary magnetic heads in an equipment chiefly used for recording and reproducing television video signals on a magnetic tape that is, for example, in an equipment wherein one or more fields of television video signals are continuously recorded by diagonally scanning a magnetic tape with sufficiently long loci by means of one or more recording rotary magnetic heads and the recorded signals are monitored by being reproduced by means of monitor reproducing rotary magnetic heads at the time of the above mentioned recording.

An object of the present invention is to prevent crosstalk effects by eliminating mutual induction between the recording rotary magnetic head and monitor reproducing rotary magnetic head by electrically shielding respective slip contacting parts for the recording rotary magnetic heads, the monitor reproducing rotary magnetic heads and amplifiers and lead wires connected to said respective slip contacting parts.

It has been usual in this type of magnetic recording and reproducing equipment that recording magnetic heads and monitor reproducing rotary magnetic heads are arranged at proper spacing with each other on the periphery of a rotary disk and said respective magnetic heads are connected to amplifying devices through two sets of slip contacting devices provided on the center axis of said rotary disk.

However, in such equipment, whereas the input terminal voltage of the recording rotary magnetic head has a value of one hundred and several tens volts, the output terminal voltage of the monitor reproducing rotary magnetic head is of a vlue of only several millivolt. Therefore, the level difference between the slip contacting devices for the respective magnetic heads adjacent to each other on the center axis of said rotary disk and between the lead wires connected to the respective contacting devices will be about 90 db. Therefore, in case the recorded status on the magnetic tape is monitored with the monitor reproducing rotary magnetic head, a leakage voltage will be produced by electrostatic or electromagnetic induction between said slip contacting devices and between said lead wires.. There is a defect that such leakage voltage will be induced in the slip contacting devices and lead wires of the monitor reproducing rotary magnetic heads and monitoring will become impossible.

According to the present invention, in order to eliminate such disadvantage, the parts where the lead wire from the recording rotary magnetic head and the lead wire from the monitor reproducing rotary magnetic head are closest to each other, that is to say, the parts of the slip contacting devices and the lead wires connected to said contacting devices are respectively shielded with metallic bodies so that the occurrence of any leakage voltage between the lead wires of the respective magnetic heads may be prevented, signals recorded on the magnetic tape may be reproduced without fail instantly at the time of recording them and said recorded signals may be monitored in a favorable state of the signal-to-noise ratio.

An embodiment of the present invention shall be detailed with reference to drawings in the following.

Figure 3:
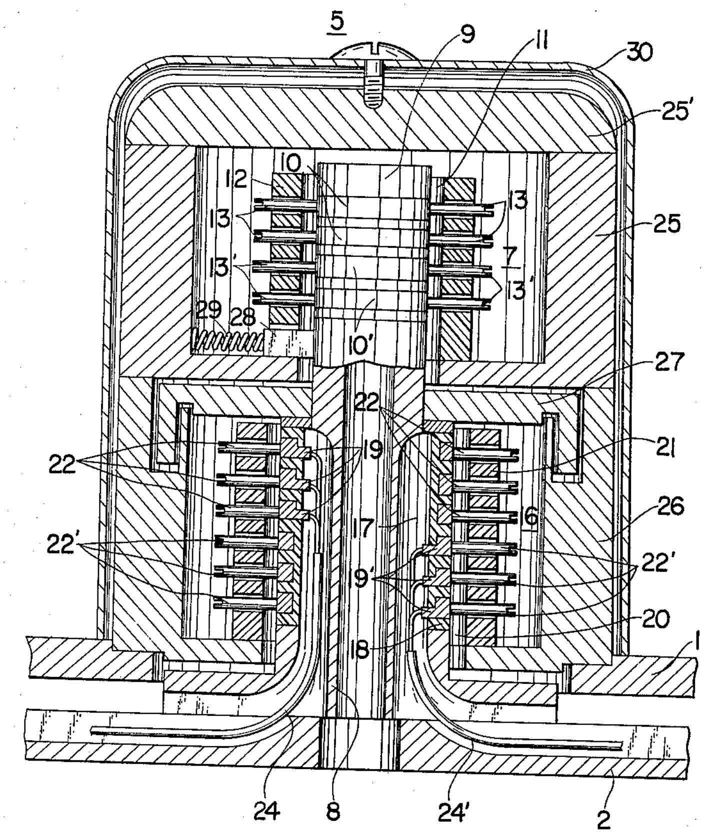
FIGURE 3 is a magnified sectioned view on line A—A' in FIGURE 1.
Figure 4:
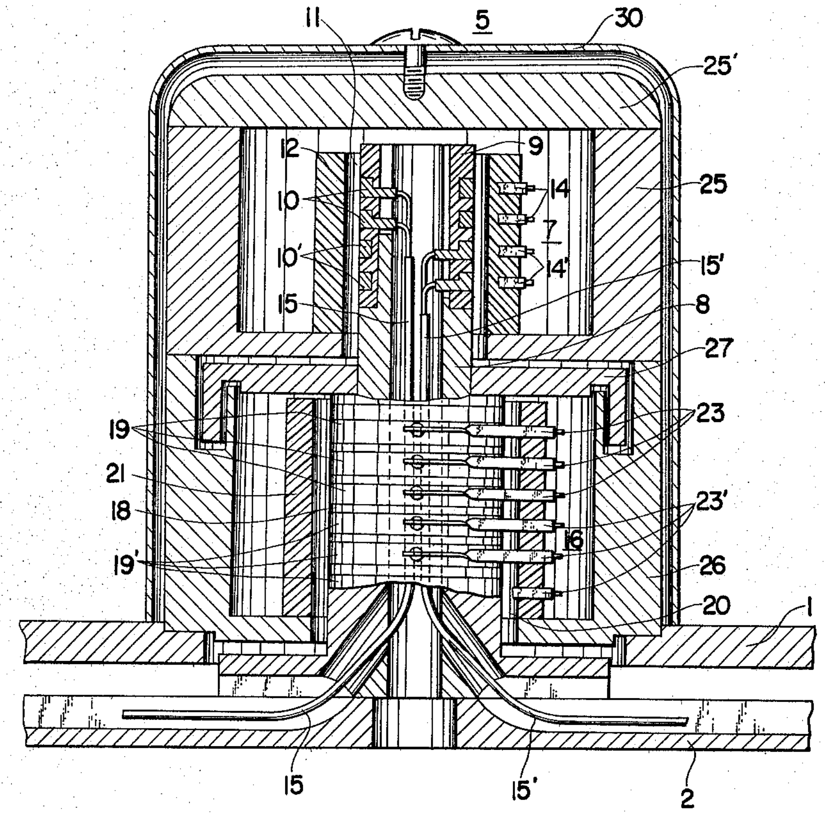
FIGURE 4 is a magnified sectioned view on line B—B' in FIGURE 1.
Figure 5:
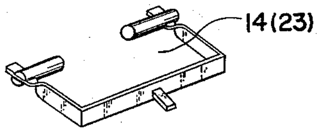
FIGURE 5 is a magnified perspective view of a brush part of the device of the present invention.

In the drawings, 1 is a guide drum and 2 is a rotary disk rotating in a central slit 1' of said guide drum 1. Said rotary disk is fitted with respective sets of recording rotary magnetic heads 3 and 3' and monitoring reproducing rotary magnetic heads 4 and 4' opposed to each other in the diametral directions intersecting at right angles with each other on the periphery. 5 is a slip contacting device according to the present invention. Said contacting device is provided on the center axis of the rotary disk 2. 6 is a magnetic tape hung diagonally on approximately half the periphery of the guide drum 1 so as to move in the direction indicated by the arrow. The slip contacting device 5 according to the present invention has such structure as in shown in FIGURES 3 and 4. In said FIGURES 3 and 4, 7 is a slip contacting device for recording rotary magnetic heads 3 and 3'. Said contact device comprises an insulating tube 9 fitted to the upper end of a shielding metallic tube 8 provided in the center of the rotary disk 2, two sets of slip rings 10 and 10' embedded at proper intervals with each other in the peripheral wall of said insulating tube 9, an insulating tube 12 fitted with a small clearance 11 around the insulating tube 9, two sets of brushes 13 and 13' in contact with said slip rings 10 and 10', respectively, by passing loosely though the peripheral wall of said insulating tube 12 and two sets of elastic brush holders 14 and 14' to press said brushes 13 and 13' against the slip rings 10 and 10'. Lead wires 15 and 15' from the recording magnetic heads 3 and 3' as inserted in the shielding metallic tube 8 are connected at the ends to said two sets of slip rings 10 and 10', respectively. Lead wires from the transformer of an amplifier mentioned below are connected to said two sets of brush holders 14 and 14'. 16 is a slip contacting device for the monitor reproducing magnetic heads 4 and 4'. Said contact device 16 comprises an insulating tube 18 fitted with a small clearance 17 around the outer periphery of said shielding metallic tube 8, two sets of slip rings 19 and 19' embedded at proper intervals with each other in the peripheral wall of said insulating tube 18, an insulating tube 21 fitted with a small clearnace 20 around the outer periphery of said insulating tube 18, two sets of brushes 22 and 22' in contact with said slip rings 19 and 19' by loosely passing through the peripheral wall of said insulating tube 21 and two sets of elastic brush holders 23 and 23' pressing said brushes 22 and 22' against the slip rings 19 and 19', respectively. Shielded lead wires 24 and 24' from the monitor reproducing rotary magnetic heads 4 and 4' as inserted in said clearance 17 are connected at the ends to said two sets of slip rings 19 and 19', respectively. Lead wires from the transformer of an amplifier mentioned below are connected to said two sets of brush holders 23 and 23'. 25 is a shielding case made of a metal. 25' is a metallic cover placed on the top surface of said shielding case 25. The slip contacting device 7 is to be shielded with said shielding case 25 and cover 25'. 26 is a shielding case made of a metal. 27 is a rotary shielding plate fitted to the shielding metallic tube 8 and made of a bowlshaped metal plate rotating with said tube 8. The slip contacting device 16 is to be shielded with said shielding case 26 and rotary shielding plate 27. 28 is a brush in sliding contact with the shielding metallic tube 9 near its central point and caused to be directly grounded without using any lead wire. 29 is a spring inserted between the brush 28 and shielding case 24. 30 is a housing.

Figure 6:
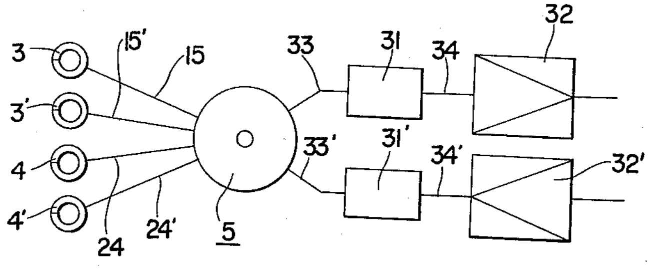
FIGURE 6 is an electric wiring diagram for the magnetic recording and reproducing equipment provided with the device of the present invention.

FIGURE 6 is an electric wiring diagram for the magnetic recording and reproducing equipment provided with the slip contacting device of the present invention. In this diagram, 3 and 3' are recording rotary magnetic heads, 4 and 4' are monitor reproducing rotary magnetic heads, 31 and 31' are transformers, 32 and 32' are amplifiers, 15 and 15' are lead wires connecting the rotary magnetic heads 3 and 3', respectively, to the slip contacting device 5, 24 and 24' are lead wires connecting the rotary magnetic heads 4 and 4', respectively, to the slip contacting device 5, 33 is a lead wire connecting the transformer 31 with the slip contacting device 5, 33' is a lead wire connecting the transformer 31' with the slip contacting device 5, 34 is a lead wire connecting the transformer 31 with the amplifier 32 and 34' is a lead wire connecting the transformer 31' with the amplifier 32'.

Figure 1:
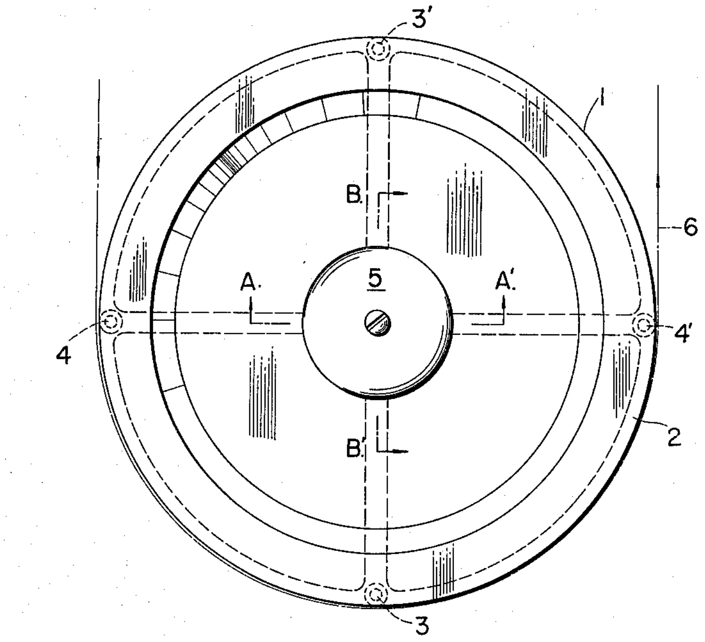
FIGURE 1 is a plan view of a magnetic recording and reproducing equipment provided with a slip contacting device according to the present invention.
Figure 2:
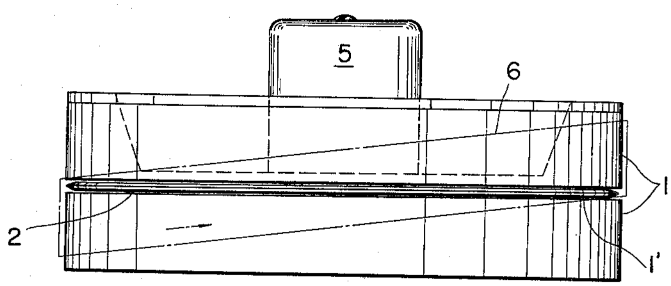
FIGURE 2 is a side view of the device shown in FIGURE 1.

In the device illustrated in FIGURES 1, 2 and 6, when the magnetic tape 6 is hung diagonally on about half the periphery of the guide drum 1 and is moved in the direction indicated by the arrow and at the same time the rotary disk 2 is rotated, magnetic records diagonal to the width of the magnetic tape 6 will be made on the tape alternately by the recording rotary magnetic heads 3 and 3' and will then be able to be reproduced and monitored alternately by the monitor reproducing rotary magnetic heads 4 and 4'.

As described above, according to the present invention, slip rings are provided through insulating tubes in the upper and lower parts of the shielding metallic tube fixed to a rotary disk having magnetic heads, said upper and lower slip rings are shielded from each other with stationary shielding cases, a grounding brush is brought into contact with said metallic tube near the central point and also with said stationary shielding cases, said metallic tube is of a multiplex structure and the lead wires from the respective magnetic heads are so made as to pass through respective shielded passages. Therefore, any mutual induction between the recording rotary magnetic heads and the monitor/reproducing rotary magnetic heads can be substantially completely avoided, and any crosstalk can be prevented from occurring. When applied to the rotary magnetic head assembly for a television video signal magnetic recording and reproducing apparatus in which the levels in the recording and the monitor/reproducing head have a very large distance, the present invention shows excellent features.

What I claim is:

1. In a rotary magnetic head assembly for a television video signal magnetic recording and reproducing apparatus wherein, while a desired television video signal is being recorded with at least one recording rotary magnetic head, the recorded signal is monitored or reproduced by scanning the magnetic medium with at least one monitor reproducing rotary magnetic head fixed to a rotary disk, a slip contacting device comprising a shielding metallic tube fixed to said rotary disk; slip-rings fitted through insulating tubes in the upper and lower parts of said tube; lead wires connecting said monitor reproducing rotary magnetic head and slip rings in one of the parts of said tube; lead wires connecting said recording rotary magnetic head and said slip-rings in the other part of said tube; stationary shielding cases shielding the upper and lower slip-rings from each other and a grounding brush coming into contact with said metallic tube near the central point and also with said stationary shielding cases, said metallic tube being of a multiplex structure and having a plurality of shielding passages so that said lead wires from the respective magnetic heads may pass through the respective shielding passages.

2. The slip contacting device according to claim 1 wherein a rotary metallic plate is provided between the slip rings provided in the upper part of the shielding metallic tube and the slip rings provided in the lower part of said tube.

References Cited by the Examiner

UNITED STATES PATENTS

| | | | |
|---|---|---|---|
| 2,916,546 | 12/59 | Ginsburg et al. | 179—100.2 |
| 2,968,702 | 1/61 | Fay | 179—100.2 |
| 3,043,918 | 7/62 | Fawcett | 179—100.2 |

IRVING L. SRAGOW, *Primary Examiner.*

BERNARD KONICK, *Examiner.*